United States Patent [19]

Reitmeier et al.

[11] 4,396,937
[45] Aug. 2, 1983

[54] USE OF A SINGLE SET OF STEERING BITS IN A PLURAL CHANNEL SYSTEM

[75] Inventors: Glenn A. Reitmeier, Trenton; Robert A. Dischert, Burlington, both of N.J.

[73] Assignee: RCA Corporation, New York, N.Y.

[21] Appl. No.: 284,786

[22] Filed: Jul. 20, 1981

Related U.S. Application Data

[63] Continuation of Ser. No. 171,379, Jul. 23, 1980.

[51] Int. Cl.³ ............................................. H04N 9/32
[52] U.S. Cl. .................................. 358/13; 358/138; 375/31; 375/33
[58] Field of Search .................. 358/12, 13, 133, 138; 375/31, 33

[56] References Cited

U.S. PATENT DOCUMENTS

| | | | |
|---|---|---|---|
| 3,462,547 | 8/1969 | Macovski | 358/133 |
| 4,204,227 | 5/1980 | Gurley | 358/13 |
| 4,227,204 | 10/1980 | Rossi | 358/13 |

*Primary Examiner*—Richard Murray
*Attorney, Agent, or Firm*—E. M. Whitacre; W. H. Meise; H. I. Steckler

[57] ABSTRACT

A multichannel sampled system uses a single set of steering bits to reconstruct deleted samples from all channels. The steering bits can be derived from the channel having the greatest bandwidth or amplitude, or by majority voting logic operating on steering bits from all channels.

19 Claims, 15 Drawing Figures

Fig. 1 – AN ADAPTIVE COMPONENT SYSTEM

R = RED SAMPLES
$S_R$ = RED STEERING BITS

G = GREEN SAMPLES
$S_G$ = GREEN STEERING BITS

B = BLUE SAMPLES
$S_B$ = BLUE STEERING BITS

Fig. 3 – DATA REQUIRED WITH A SINGLE SET OF STEERING BITS

R = RED SAMPLES

G = GREEN SAMPLES
$S_M$ = MAJORITY STEERING BITS

B = BLUE SAMPLES

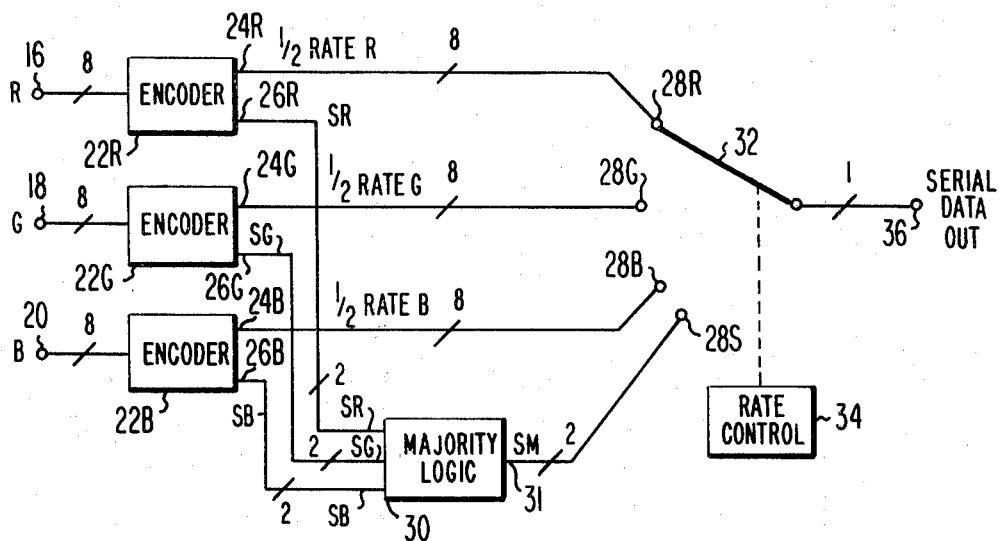
Fig. 2 — AN ADAPTIVE COMPONENT SYSTEM WITH A SINGLE SET OF STEERING BITS
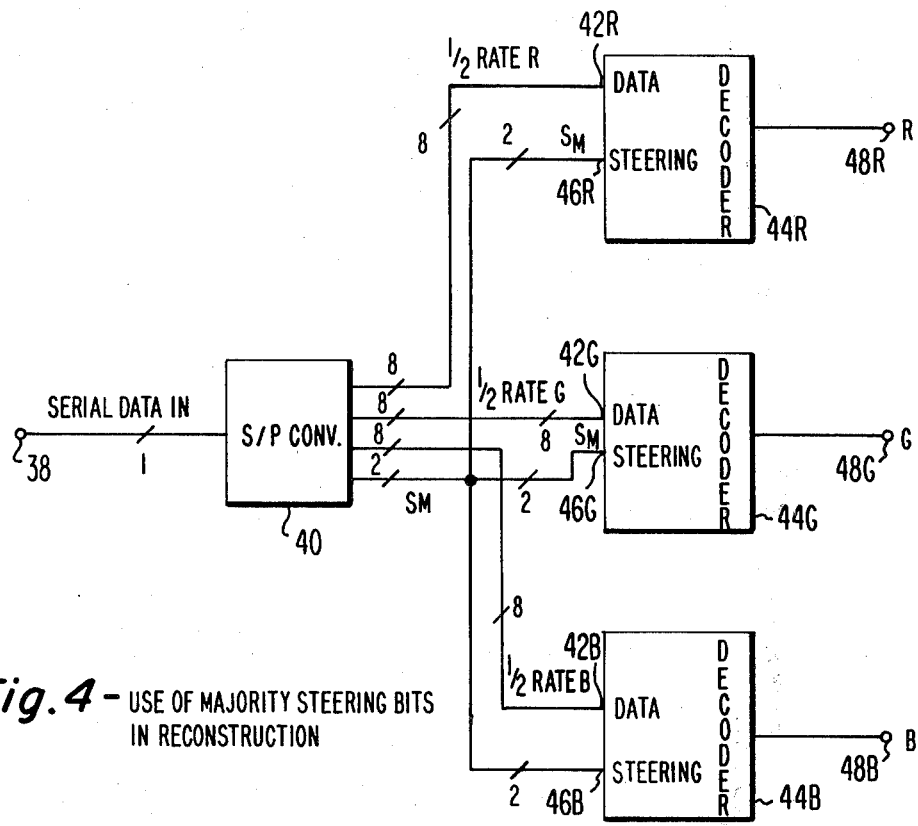
Fig. 4 — USE OF MAJORITY STEERING BITS IN RECONSTRUCTION

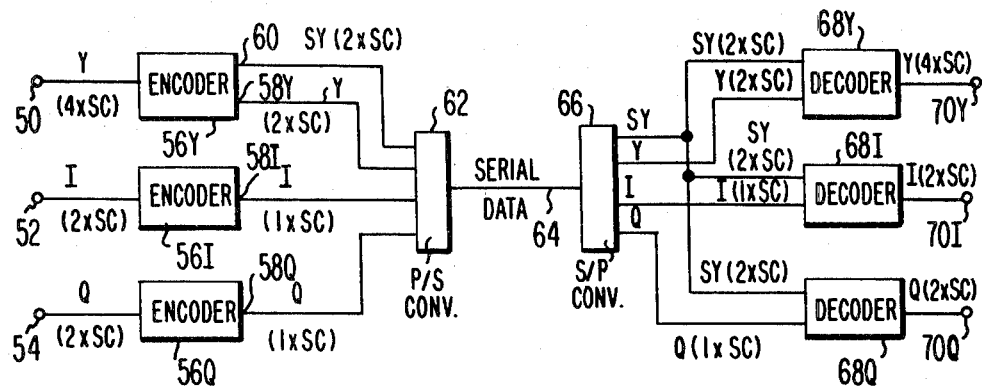
Fig. 5 — USE OF LUMINANCE STEERING BITS IN AN ADAPTIVE COMPONENT SYSTEM
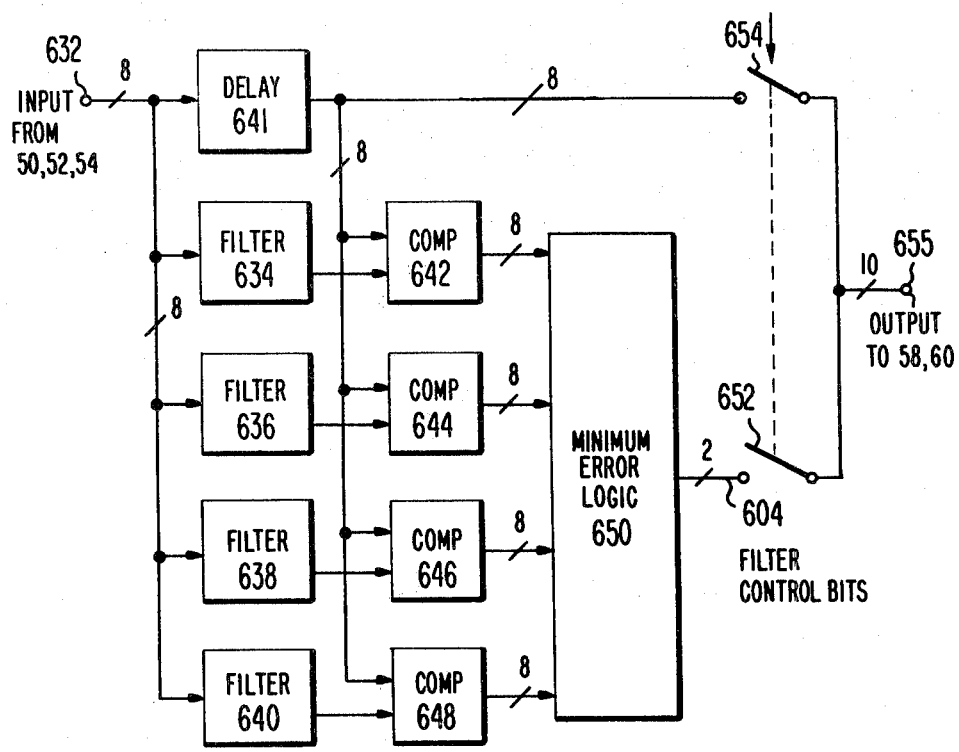
ENCODER
Fig. 6

Fig. 7 DECODER

USE OF A SINGLE SET OF STEERING BITS IN A PLURAL CHANNEL SYSTEM

This is a continuation of application Ser. No. 171,379, filed July 23, 1980.

BACKGROUND OF THE INVENTION

The present invention relates to digital video systems, and more particularly, to systems for reducing the required data rate without sacrificing picture quality.

U.S. patent application Ser. No. 132,137, filed Mar. 20, 1980, entitled "DATA RATE REDUCTION FOR DIGITAL VIDEO SIGNALS BY SUBSAMPLING AND ADAPTIVE RECONSTRUCTION", filed in the name of the present inventors, describes a method of data rate reduction for digital video systems by deleting, i.e., not transmitting, every other picture sample, and transmitting in place of the deleted samples, a set of "steering" or control bits which enable the deleted samples to be reconstructed from the nondeleted (transmitted) samples. In particular, the steering or control bits contain information as to which of the average of pairs of undeleted samples surrounding the deleted sample is a closest match to the deleted sample. Thus, at the receiver the average of the pair that is a closest match to the deleted sample is substituted for the deleted sample. The invention contemplates a video signal including a plurality of component signals, such as red, blue and green color components of a television signal. A system according to the aforementioned application when used with a plural channel system having multiple signal components will require a lower data rate than a conventional system; however, distinct sets of steering bits would be required for all channels to reconstruct the deleted samples in each channel.

It is therefore desirable to reduce still further the required data rate and amount of hardware needed.

SUMMARY OF THE INVENTION

The invention comprises information signals present in a plurality of information channels, each signal comprising first and second time portions, transmitting said first portions, generating control signals from the information of at least one channel adapted to control the reconstruction of a plurality of said second portions from the transmitted first portions, and transmitting said control signals.

DESCRIPTION OF THE DRAWINGS

FIG. 1 shows a diagram useful in explaining the prior art showing portions of three sampled line-scan rasters which will have distinct sets of steering bits;

FIG. 2 is a block diagram of a transmitter in accordance with the present invention;

FIG. 3 shows portions of sampled rasters of three channels, only a single channel transmitting steering bits which are located in place of undisplayed deleted samples;

FIG. 4 is a block diagram of a receiver in accordance with the present invention;

FIG. 5 is a block diagram of a transmission system including a receiver as in FIG. 4 together with an alternate embodiment of a transmitter;

FIG. 6 illustrates a block diagram of an encoder for encoding samples of a video signal and control signals in accordance with an embodiment of the invention;

DETAILED DESCRIPTION

Figure 7:
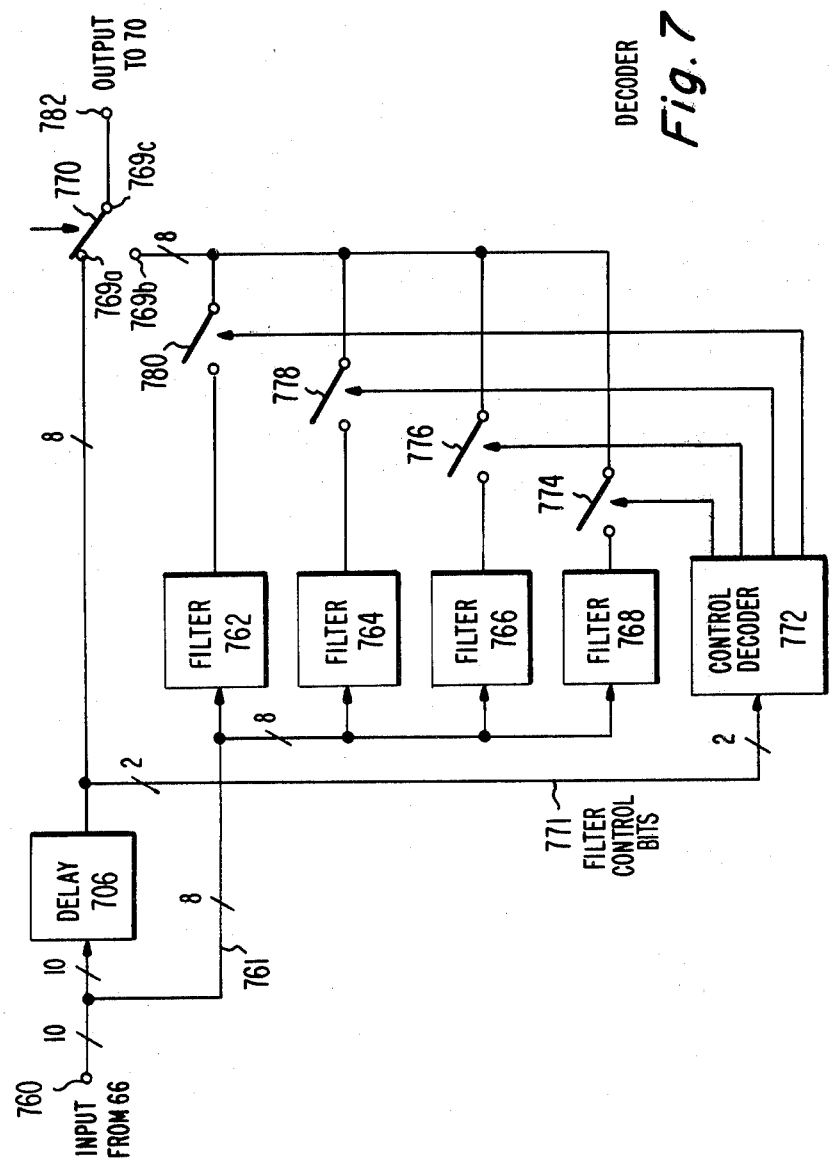
FIG. 7 illustrates a block diagram of a decoder for decoding information encoded by the apparatus of FIG. 6.

FIG. 1 shows portions of sampled line scanned rasters 10, 12 and 14 respectively and associated signals representative of the red, green and blue color components of a scene. The symbols R, G, and B, indicate red, green and blue picture samples of the rasters 10, 12 and 14 that will be transmitted. These transmitted samples occur at a 7.16 MHz rate in a preferred embodiment, which is twice the NTSC color subcarrier frequency. Thus, a sample occurs every 140 nanoseconds. The letter S with appropriate subscript represents steering bits that would be transmitted in place of deleted samples of picture elements if the system of said prior application is used for each channel. The steering bits also occur at a 7.16 MHz rate. It will be noted that every other sample of the video signal originally sampled at a 14.32 MHz rate has been deleted in each raster and that the position of the deleted samples in the raster alternates in a position from horizontal line to horizontal line, and therefore the position of the steering bits alternates from line to line. This alternation enables the steering bits to contain information as to which of the surrounding four pairs of transmitted samples is the closest match to a particular deleted sample. In FIG. 1, for the particular deleted sample designated 114 in the green field, the average of the vertically adjacent samples 116 and 118, the average of the horizontally adjacent samples 120 and 122, the average of the left diagonal samples 128 and 130, or the average of the right diagonal samples 126 and 124, are compared with sample 114, and the results of the comparisons are evaluated by a logic circuit to determine which average of the surrounding samples to be transmitted is the best approximation to sample 114, which is not to be transmitted. In place of deleted sample 114, a set of steering bits is added to the bits carrying information as to the amplitude of previous transmitted sample 120. Since in the above example there are four choices, the steering word can comprise as few as two bits, and since they are replacing a deleted sample of eight bits, there is a net reduction in the amount of information being transmitted (see said prior application for a fuller explanation). The same concept is used for the red and blue fields to generate steering bits, for total of three sets of steering bits.

The present invention uses a single set of steering bits to control the steering in all three channels. This is possible because the three channels of components of a television signal, e.g., R, G, B, or Y, I, Q, are normally highly redundant when representing a typical scene, and therefore one set of steering bits will suffice to indicate the direction of resolution in all three; that is to say, that at the same time the three channels will not ordinarily have edges in different directions, the edges will occur in the same direction.

FIG. 2 shows a block diagram of a transmitter for carrying out this concept. Red, green and blue color representative digital component signals of a single television raster scan signal are received at input terminals 16, 18 and 20 respectively. They are applied to encoders 22R, 22G, and 22B respectively. Outputs 24R, 24G, and 24B supply digital eight parallel bits representing every other sample of the respective input signals to switch contacts 28R, 28G, and 28B respectively for a time period until the next sample is present at outputs 24R, 24G, and 24B. For example, if the signals at inputs 16, 18 and 20 occur at 70 nanosecond intervals, the signals at outputs 24R, 26G, and 24B, are each simultaneously present for 140 nanoseconds. Outputs 26R, 26G, and 26B each provide two steering bits in place of the samples that are not present at outputs 24R, 26G, and 24B respectively. The steering bits are applied to a majority logic circuit 30. Majority logic circuit 30 is a means of deciding, based on majority voting of the three sets of steering bits, which of the three sets of steering bits will best represent all three channels during reconstruction at the receiver. Thus, if any two or more sets of steering bits are the same, they will be transmitted as the majority steering bits called "Sm" at output 31 and are present for 140 nanoseconds. Otherwise the bits from a single component will be selected. Since green is the largest component of a luminance signal, it is preferable to select its steering bits for transmission. Alternately, steering bits may be chosen from the component signal having the largest amplitude. The selected steering bits are applied to two-bit input contact 28S of switch 32. Rate control circuit 34 sequentially moves switch 32 among the contacts 28 so that at one-bit output 36 the transmitted samples from each of the color component channels are serially supplied along with the single set of steering bits from majority logic circuit 30. Since there are a total of 26 (3 channels×8 bits+1 channel×2 bits) contacts 28, switch 32 must cycle at a rate 26 times that of the data rate of the signals at outputs 24R, 24G, 24B of the encoders 22R, 22G, and 22B. With this system, the samples and data can be represented as shown in FIG. 3 where the number of steering bits is reduced to ⅓ of that needed for fully independent steering of each channel as shown in FIG. 1.

The picture is reconstructed exactly as in the independent channel case of the prior patent except that the majority steering bits are used to steer all three channels as is shown in the receiver of FIG. 4. The transmitted data is received at terminal 38 and applied to a serial-to-parallel converter 40 which simultaneously applies the red transmitted samples to input 42R of red decoder 44R, the green transmitted samples to input 42G of green decoder 44G, and the blue transmitted samples to input 42B of blue decoder 44B. Further, the majority steering bits are simultaneously applied in parallel to inputs 46R, 46G, 46B of the decoders 44R, 44G, and 44B respectively. Decoder 44R provides at output terminal 48R, the reconstructed digital red signal; the decoder 44G supplies at output terminal 48G, the reconstructed digital green signal; and the decoder 44B applies an output terminal 48B, the reconstructed digital blue signal, all of the reconstruction having been done using majority steering bits.

The same concept of using a single set of steering bits may also be used in a luminance (Y) and two color component (I,Q; R-Y, B-Y) system with one slight difference. The Y channel will have a higher data rate and consequently a higher bandwidth than either the I or Q channels. Hence, since the luminance channel Y will have more resolution than the color channels I and Q, the direction of reconstruction indicated for this channel will be adequate for the lower bandwidth channels. Therefore, steering bits derived only from the Y channel are used to reconstruct the luminance as well as the color component channels. As shown in FIG. 5, Y, I and Q digital signals are received at input terminals 50, 52 and 54. In a particular embodiment, the Y signal comprises samples occurring at four times the color subcarrier frequency, while the I and Q signals comprise samples occurring at only twice the subcarrier frequency. The signals are applied to encoders 56Y, 56I and 56Q. Samples occurring at two times the subcarrier frequency are provided by the encoders at output 58Y and at the subcarrier frequency at outputs 58I and 58Q. Encoder 56Y also provides steering bits at output 60. These steering bits occur at twice the subcarrier rate. All of these signals are applied to a parallel-to-series converter 62 where they are sequentially sent as serial data over a transmission path 64 to a serial-to-parallel converter 66. Serial-to-parallel converter 66 simultaneously provides steering bits from the Y signal to decoders 68Y, 68I and 68Q. It also provides the Y signal to decoder 68Y, the I signal to decoder 68I, and the Q signal to decoder 68Q. The decoder 68Y provides a reconstructed digital Y signal occurring at four times the subcarrier frequency at output terminal 70Y, the decoder 68I provides a reconstructed digital I signal which occurs at two times the subcarrier frequency at output terminal 70I, and the decoder 68Q provides a reconstructed digital Q signal at output terminal 70Q which occurs at two times the subcarrier frequency.

Figure 9:
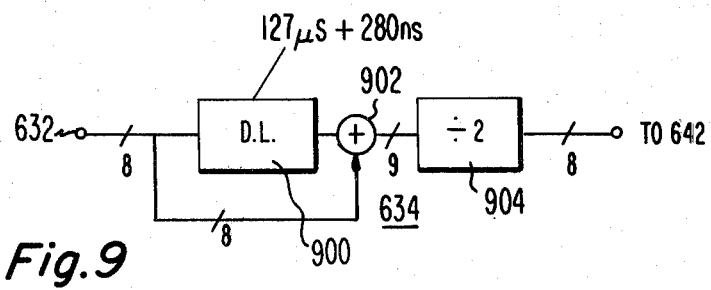
FIGS. 9, 10, 11 and 12 illustrate block diagrams of filters used in FIGS. 6 and 7.
Figure 10:
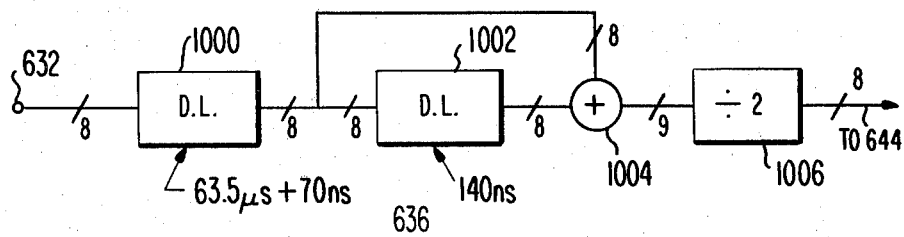
Figure 11:
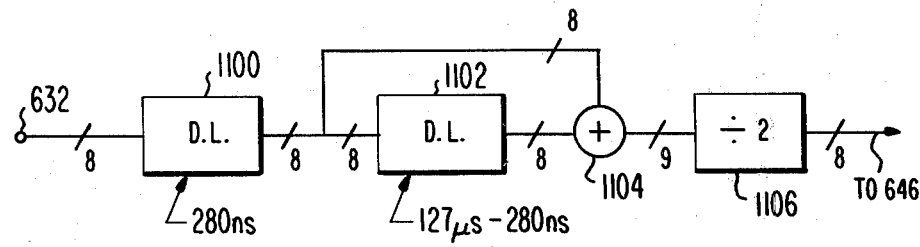
Figure 12:
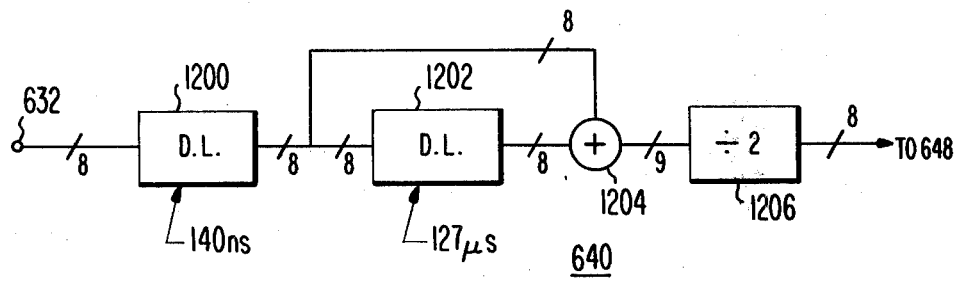

FIG. 6 illustrates an encoder for use in FIGS. 2 and 5. An input 632 receives the digital video signal having samples occurring, in a particular embodiment, at 14.32 MHz with 8 bits per sample. The 8 bits of each sample are applied to a delay line 641 and to filters 634, 636, 638 and 640. These filters are used to provide the average of the surrounding samples. By "average" is meant adding together the signal values represented by each of the two 8-bit samples and then dividing the resulting sum by two. As can be determined by inspection of FIG. 1, sample points 128 and 130 are spaced in time by two horizontal lines and four signal sampling intervals. This corresponds to approximately 127 microseconds, in the NTSC system, plus 280 nanoseconds. FIG. 9 illustrates the details of filter 634 which comprises a digital delay line 900 having a delay of 127 microseconds plus 280 nanoseconds coupled between input terminals 632 and an input terminal of a digital adder 902. Undelayed signals from terminal 632 also are coupled to a second input terminal of adder 902. The digital sum of these signals, corresponding to the video signals at sample points 128 and 130, is obtained at the output terminal of adder 902 and coupled to an input terminal of a digital divider 904. Divider 904 divides this summed signal by two to provide at its output terminal an 8-bit parallel signal representing the average signal of sample points 128 and 130. This averaged signal is coupled to an input terminal of a comparator 642 in FIG. 6. Delay line 641 also comprises an 8-bit digital delay line and has a delay of about 63.5 microseconds plus 140 nanoseconds. This time is equal to one-half of the total delay of delay line 900 of filter 634, and delays the video at sample point 114 of FIG. 1 that is not to be transmitted so it will be in time coincidence with the averaged signal from filter 634 so the two signals can be compared by comparator 642. Filter 636 supplies the average of points 120 and 122 (a "horizontal" average). It comprises an 8-bit wide digital delay line 1002 in FIG. 10 having a delay of about 140 nanoseconds. The input (undelayed) and output (delayed) signals of this delay line are averaged by adder 1004 and divider 1006. An additional equalizing delay of one line plus 70 nanoseconds to compensate for the delay line 641 is provided by delay line 1000 within filter 636. The output signal of filter 636 from divider 1006 is supplied to a comparator 644 in FIG. 6. Filter 638 supplies the average of diagonal points 124 and 126 (a "second diagonal" average). It comprises an 8-bit digital delay line 1102 in FIG. 11 having a delay of two horizontal lines minus 280 nanoseconds. The delayed and undelayed signals are averaged by adder 1104 and divider 1106, while the digital signal from input 632 is first delay equalized by a 280 nanosecond delay line 1100. The output signal from divider 1106 is applied to a comparator 646 in FIG. 6. Lastly, filter 640 supplies the average of points 116 and 118 (a "vertical" average). It comprises an 8-bit digital delay line 1202 in FIG. 12 having a delay of two horizontal lines. The delayed and undelayed signals are averaged by adder 1204 and divider 1206, while the digital signal from input 632 is first delay equalized by a 140 nanosecond delay line 1200. The output signal from divider 1206 is applied to a comparator 648 in FIG. 6.

Figure 13:
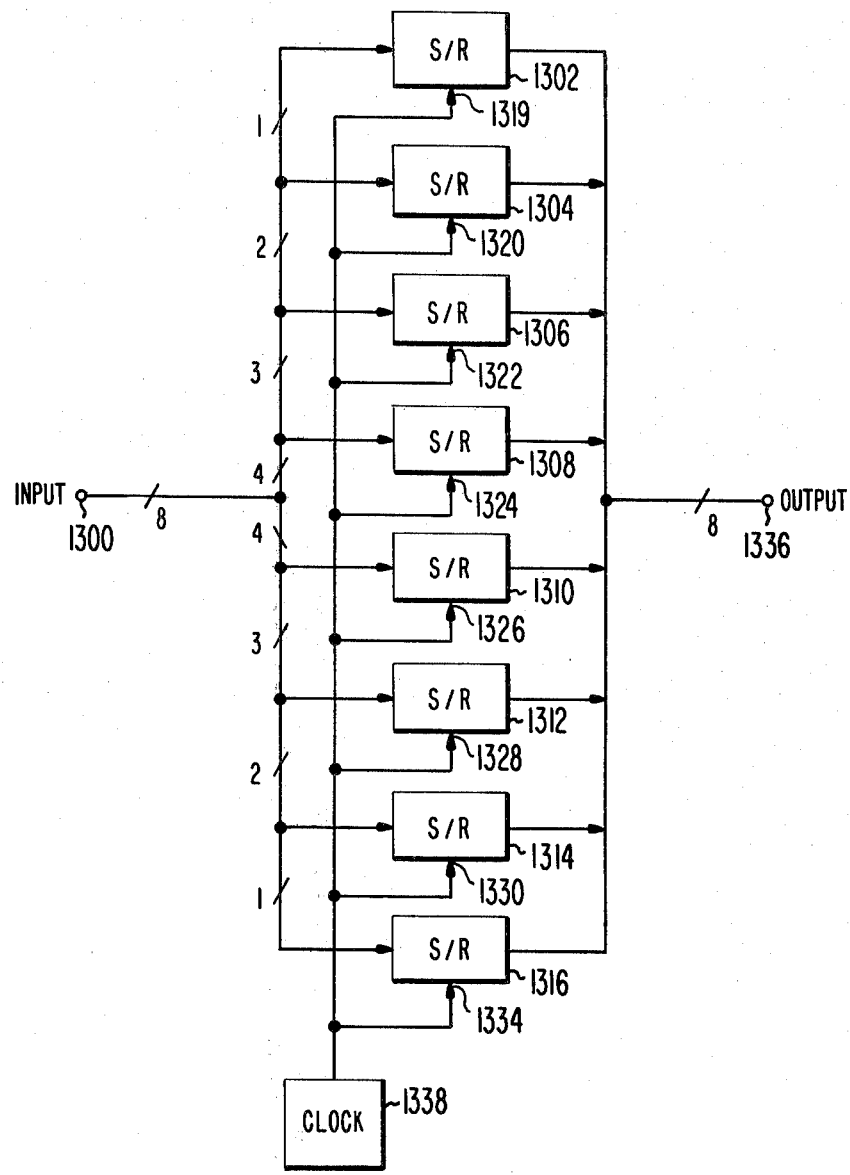
FIG. 13 shows a block diagram of a digital delay line used in FIGS. 6, 7, 10, 11, and 12.

FIG. 13 shows an 8-bit wide delay line for use in the filters 634, 636, 638 and 640 and delay 641. It comprises eight shift registers 1302, 1304, 1306, 1308, 1310, 1312, 1314 and 1316, each of which receives one bit of the 8-bits simultaneously present at input 1300. The bits are shifted within the registers under the control of a clock signal from clock 1338 coupled to shift inputs 1318, 1320, 1322, 1324, 1326, 1328, 1330, and 1334. The number of stages of the shift registers are chosen to achieve the desired delay. The outputs of the shift registers are coupled to 8-bit parallel output 1336. Comparators 642, 644, 646 and 648 each comprise an 8-bit subtractor that also receives the original 8-bit samples through delay line 641 in addition to the outputs of filters 634, 636, 638 and 640 respectively. The respective two signals in each comparator are subtracted and then the absolute value is taken of the resulting difference. The comparators apply absolute value signals to a minimum error logic circuit 650.

Figure 8:
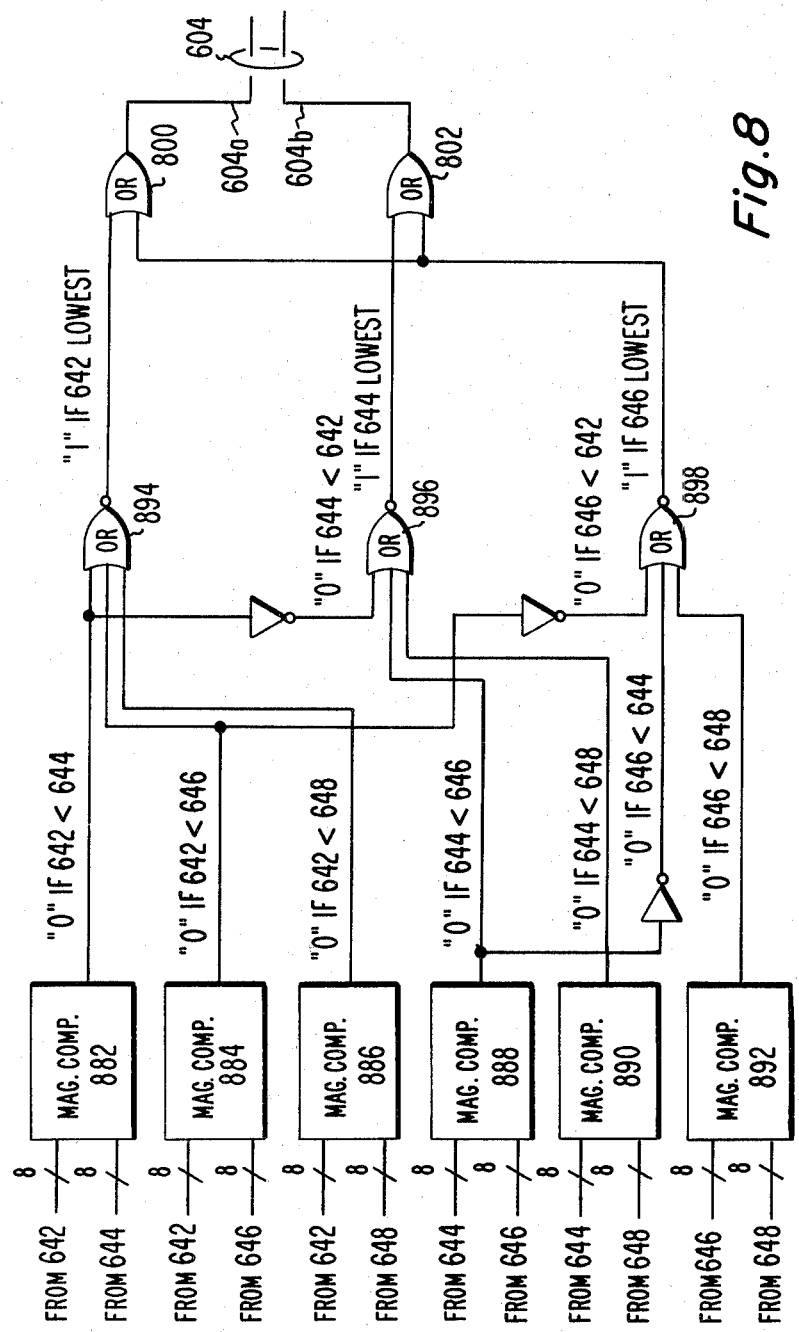
FIG. 8 shows a block diagram of a minimum-error logic circuit used in FIG. 6.

As shown in FIG. 8, minimum error logic circuit 650 comprises 6 magnitude comparators 882, 884, 886, 888, 890 and 892, each of which receives two 8-bit numbers from different pairs of the output signals of comparators 642, 644, 646 and 648 and supplies at its respective output a one-bit logic level indication to indicate which of the two respective input numbers is smaller. It should be noted that there are only six possible combinations of four numbers taken in pairs, thus giving rise to the six magnitude comparators. It is only necessary to look at three of the magnitude comparator outputs to determine if a specific magnitude comparator input is the lowest. Thus NOR gates 894, 896, and 898 are used to detect if the output signal from comparators 642, 644, and 646 respectively are the lowest. If none are the lowest, the output signal from 648 is assumed to be the lowest which will be true, or none will be lowest, i.e., they are all equal, in which latter case the output signal from any comparator will do. The output signals from gates 894, 896, and 898 are coded by OR gates 800 and 802 into the 2-bit control signal on bus 604 in accordance with the following truth table:

| Line No. | Lowest Signal | | | |
|---|---|---|---|---|
| | 642 | 644 | 646 | 648 |
| 604a | 1 | 0 | 1 | 0 |
| 604b | 0 | 1 | 1 | 0 |

The output of logic circuit 650 comprises two bits in accordance with the above table which indicate which of the pairs of samples of adjacent points is the closest match, i.e., represents which direction has the least change of the video signal around the sample point 114. This two-bit signal makes up the control signal indicating which of the transmitted video sample signals most closely represents the untransmitted video signal so that complete video information can be obtained upon decoding. The two central bits are applied to a switch 652 in FIG. 6, which is a two-bit switch operated in synchronization with an 8-bit switch 654 in FIG. 6 at a 7.16 MHz switching rate. This switching rate, since it is 14.32 MHz divided by 2, causes switch 654 to pass or transmit only every other 8-bit sample. The 2 control bits from logic circuit 650, that indicate which of the adjacent samples are to be used in reconstructing the untransmitted points, are passed by switch 652, and together with the 8 bits simultaneously passed by switch 654 representing a transmitted point, form a 10-bit parallel word at 10-bit parallel output 655.

FIG. 7 shows the decoder for use in the present invention. The 10-bit parallel signal is received at input 760. The 8 bits representing a sample of a picture point are applied by 8-bit bus 761 to filters 762, 764, 766 and 768, the internal construction of which is the same as filters 634, 636, 638 and 640 respectively. The same 8 bits are also applied to contact 769a of 8-bit switch 770 through delay line 706 that has the same delay as delay line 641 and which compensates for the delay through filters 762, 764, 766, and 768. The two control bits are brought out on 2-bit bus 771 and applied to control decoder 772 for control of switches 774, 776, 778, and 780. This decoder comprises a one-of-four decoder, such as integrated circuit No. SN 74S139, manufactured by Texas Instruments, that takes the two control bits and gives a 4-bit parallel output, only one of which will be high. The 4 parallel bits are applied to the switches 774, 776, 778 and 780 respectively. Since only one of the outputs of control decoder 772 will be high, only one of the switches 774, 776, 778 and 780 will be closed at any one time at a 7.16 MHz rate. This applies the signal from that one of the filters 762, 764, 766, and 768 which is the closest match for a missing sample to contact 769b of switch 770. Switch 770 is switched at a 14.32 MHz rate between its two inputs 769a and 769b, and thus alternately supplies a sample point of the original picture and a reconstructed 8-bit signal to its output 769c and to decoder output 782. Since each of the signals occurs at a 7.16 MHz rate, the resulting signal from output 769c of switch 770 is at 14.32 MHz.

Figure 14:
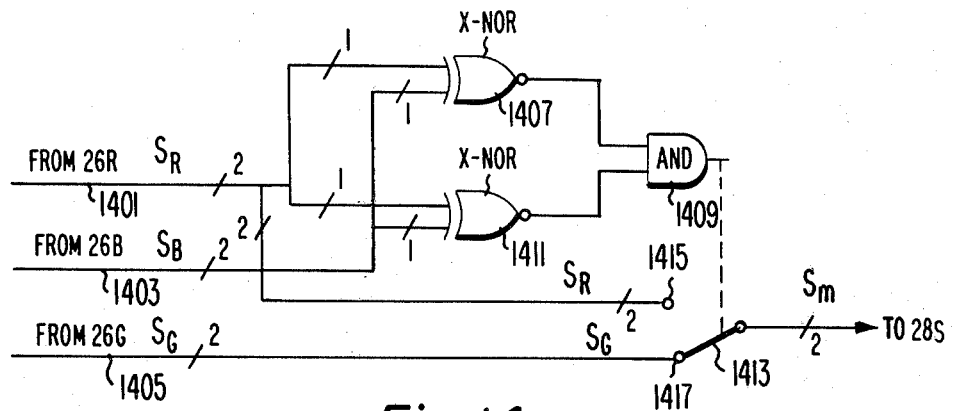
FIG. 14 shows a block diagram of a majority logic circuit used in FIG. 2.

FIG. 14 shows a block diagram of a majority logic circuit 30 used in FIG. 2. In general, it is desired to use the following rules in order to select the steering bits. If the red, blue and green sets of steering bits are all the same, then any one of the sets can be used, and in this embodiment the red set is used. If red and green or blue and green are the same, then the green set is used. If red and blue are the same, then either red or blue can be used, and in this embodiment red is used. If all steering bits are different, the green set is used.

As shown in FIG. 14, red, blue and green steering bits ($S_R$, $S_B$, and $S_G$) are received on two-bit lines 1401, 1403 and 1405 respectively from encoder outputs 26R, 26B, 26G respectively. The first pair of corresponding bits of the red and blue steering bits are applied to respective inputs of exclusive-NOR gate 1407. Gate 1407 supplies a high signal to one input of AND gate 1409, if both of its inputs are the same. The remaining second pair of corresponding bits of the red and blue sets of steering bits are applied to respective inputs of exclusive-NOR gate 1411. Gate 1411 supplies a high signal to the other input of AND gate 1409, if both of its inputs are high. Gate 1409 supplies a high signal if both its inputs are high, i.e., there is a match between both corresponding pairs of the red and blue steering bits. The high signal from gate 1409 controls two-bit switch 1413 so its wiper arm is contacting contact 1415 (the position not shown in FIG. 14) to supply to input 28S of FIG. 2 the red steering bits for use as majority steering bits. If there is no match for either of the corresponding pairs, then the output signals from either or both of gates 1407 and 1411 is low and hence the output signal from gate 1409 is also low. Switch 1413 then is in the position shown in FIG. 14, i.e., contacting contact 1417, and the green steering bits are supplied as the majority steering bits. Thus, the rules described above are carried out.

Figure 15:
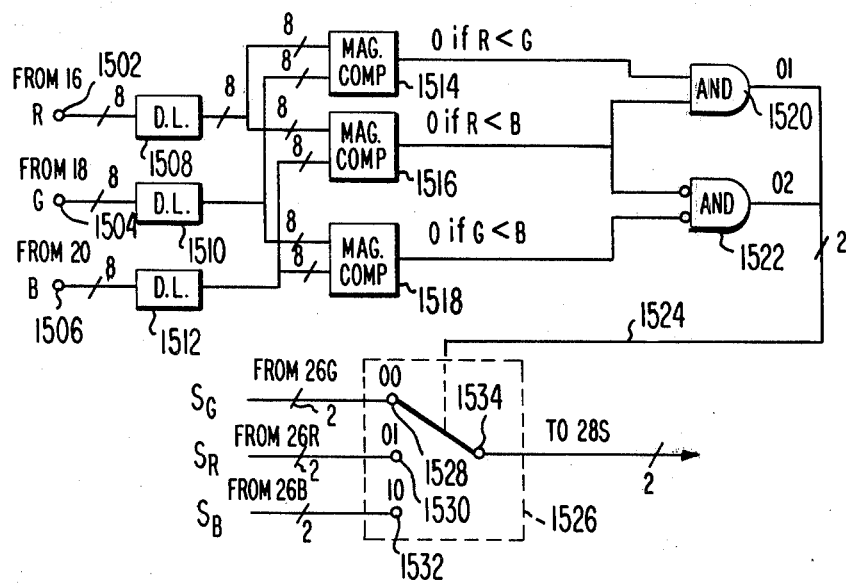
FIG. 15 shows a block diagram of a steering bit generator that is used in place of the majority logic circuit used in FIG. 2.

FIG. 15 shows a block diagram of a circuit used instead of majority logic circuit 30 of FIG. 2. The circuit of FIG. 15 provides steering bits from whichever of signals R, G or B has the greatest amplitude. Input terminals 1502, 1504, 1506 are coupled to input terminals 16, 18, and 20 respectively and respectively receive the red, green, and blue digital signals, and respectively apply said signals to eight-bit digital delay lines 1508, 1510 and 1512, which delay lines have the same delay as is inherent in encoders 22R, 22G, 22B. The red and green delayed signals are then applied to magnitude comparator 1514. The delayed green signal is also applied to magnitude comparator 1518, while the delayed blue signal is applied to magnitude comparators 1516 and 1518. Magnitude comparator 1516 supplies a zero signal to AND gates 1520 and 1522 if the red signal is less than the blue signal. Similarly, comparator 1518 supplies a zero signal to gate 1522 if the green signal is less than the blue signal.

The output signals from gates 1520 and 1522 are called "01" and "02" respectively and are determined in accordance with the following truth table.

| Video Signal Condition | Output Of | | | | |
|---|---|---|---|---|---|
| | 1514 | 1516 | 1518 | 01 | 02 |
| R < G < B | 0 | 0 | 0 | 1 | 0 |
| R < B < G | 0 | 0 | 1 | 0 | 0 |
| B < R < G | 0 | 1 | 1 | 0 | 0 |
| G < R < B | 1 | 0 | 0 | 1 | 0 |
| G < B < R | 1 | 1 | 0 | 0 | 1 |
| B < G < R | 1 | 1 | 1 | 0 | 1 |

The output signals 01 and 02 are present on two-bit bus 1524, and are used to control switch 1526, which switch has input terminals 1528, 1530 and 1532 that receive green, red, and blue steering bits from outputs 26G, 26R, and 26B respectively. An output terminal 1534 supplies to terminal 28S steering bits in accordance with output signals 01 and 02 (as indicated next to terminals 1528, 1530, and 1532), which in turn is in accordance with the R, G or B signal having the largest amplitude.

It will be appreciated that other embodiments are possible within the spirit and scope of the invention. For example, transmission path 64 can include a video recorder/reproducer. Further, the steering or control signal or bits can be transmitted in parallel with the transmitted samples for greater speed.

What is claimed is:

1. A method of transmitting information signals present in a plurality of information channels, each signal comprising first and second time portions, said method comprising transmitting said first portions, generating control signals from the information of at least one channel adapted to control the reconstruction of a plurality of said second portions from the transmitted first portions, and transmitting said control signals.

2. A method as claimed in claim 1, wherein said transmitted control signal always is from the same channel.

3. A method as claimed in claim 1, wherein said channels are at least three in number.

4. A method as claimed in claim 3, wherein said generating step comprises generating control signals in all channels, and further comprising determining which of said control signals are transmitted by majority voting.

5. A method as claimed in claim 3, wherein said generating step comprises generating control signals in all three channels and further comprising determining which of said control signals are transmitted in accordance with which information signal has the greatest amplitude.

6. A method as claimed in claim 3, wherein said three channels comprise red, green and blue color television signals respectively.

7. A method as claimed in claim 3, wherein said three channels comprise luminance and in-phase and quadrature color television signals respectively.

8. A method as claimed in claim 1, wherein said control signal represents the closest match of the untransmitted second portions of selected combinations of said first portions.

9. An apparatus for transmitting information signals present in a plurality of information channels, each signal comprising first and second time portions, said apparatus comprising means for transmitting said first portions, means for generating a control signal for at least one channel adapted to control the reconstruction of said second portions from the transmitted first portions, and means for transmitting a control signal from only one channel at a time.

10. An apparatus as claimed in claim 9, wherein said transmitted control signal always is from the same channel.

11. An apparatus as claimed in claim 9, wherein said channels are at least three in number.

12. An apparatus as claimed in claim 11, wherein said generating means generates control signals in all channels and further comprising majority logic means for determining which of said control signals are transmitted.

13. An apparatus as claimed in claim 11, wherein said three channels comprise red, green and blue color representative television signals respectively.

14. An apparatus as claimed in claim 11, wherein said three channels comprise luminance and in-phase and quadrature color television signals respectively.

15. An apparatus as claimed in claim 9, wherein said control signal represents the closest match of the untransmitted second portions of selected combinations of said first portions.

16. An apparatus as claimed in claim 11, wherein said generating means comprises means for generating control signals in all three channels and further comprising means for determining which of said control signals are transmitted in accordance with which information signal has the greatest amplitude.

17. A television sampled transmission channel adapted for carrying information relating to a plurality of components of a television signal, comprising:
   first sampling means for sampling a first component of said television signal to form samples of a first component;
   second sampling means for sampling a second component of said television signal to form samples of a second component;
   first transmitting means coupled to first sampling means for transmitting through said channel a portion of said samples of said first component;
   second transmitting means coupled to said second sampling means for transmitting through said channel a portion of said samples of said second component;
   first and second averaging means coupled to said first and second transmitting means, respectively, for generating a plurality of averages of said portions of said first and second components;
   control signal generating means coupled to said transmitting means and to said averaging means for generating control signals indicative of which of said averages most closely approximates those portions of said samples which are transmitted, and for transmitting said control signal; and
   decoding means coupled to said first and second transmitting means and to said control signal generating means and responsive to one of said control signals for generating for each of said components a regenerated average signal and for combining said regenerated average signals with said samples of said first and second components for reconstituting said components.

18. A method for processing information signals in a plurality of information channels, comprising:
   comparing samples of said information signals in at least one of said channels with a plurality of selected combinations of said samples within said channel;
   selecting from among said plurality of selected combinations those combinations which are the best match with the samples being compared; and
   generating new samples within another information channel by use of the signal in said other channel and said best match combination.

19. An apparatus for processing information signals in a plurality of information channels, comprising:
   means for comparing samples of said information signals in at least one of said channels with a plurality of selected combinations of said samples within said channel;
   means for selecting from among the plurality of selected combinations those combinations which are the best match with the samples being compared; and
   means for generating new samples within another information channel by use of the signal in said other channel and said best match combination.

* * * * *